US005606166A

United States Patent [19]
Tararine

[11] Patent Number: 5,606,166
[45] Date of Patent: Feb. 25, 1997

[54] METHOD FOR CORRECTING THE UNIFORMITY OF A GAMMA CAMERA

[75] Inventor: Michel Tararine, Sceaux, France

[73] Assignee: Sopha Medical, Buc Cedex, France

[21] Appl. No.: 443,539

[22] Filed: May 18, 1995

[30] Foreign Application Priority Data

May 18, 1994 [FR] France ................................. 94 06350

[51] Int. Cl.[6] ................................................. G01T 1/164
[52] U.S. Cl. .................................. 250/363.07; 250/363.09
[58] Field of Search ........................ 250/363.07, 363.09, 250/369

[56] References Cited

U.S. PATENT DOCUMENTS

| | | | |
|---|---|---|---|
| 4,323,977 | 4/1982 | Arseneau | 250/363.09 |
| 4,588,897 | 5/1986 | Inbar et al. | 250/369 |
| 5,173,608 | 12/1992 | Motomura et al. | 250/363.09 |

FOREIGN PATENT DOCUMENTS 0309165  9/1987  European Pat. Off. .

OTHER PUBLICATIONS

Medical Physics, vol. 19, No. 2; Manglos et al.; *Detection Nonuniformity Measurements and Corrections for Cone Beam Transmission CT on a Gamma Camera*; published Nov. 14, 1991; pp. 491–500.

*Primary Examiner*—Carolyn E. Fields
*Attorney, Agent, or Firm*—Nilles & Nilles, S.C.

[57] ABSTRACT

A method for the correction of uniformity of a gamma camera comprising a detector giving, for each pixel i,j having coordinates $x_i$, $y_i$, a number $n_{ij}$ representing the number of scintillations recorded in said pixel. The method comprises an initial step consisting in:

placing a point source at a finite distance from said detector;

acquiring the number $n_{ij}$ at each pixel i,j, computing the parameters $x_o$, $y_o$, $z_o$ that minimize the function:

$$F = \sum_{i,j} (N_{ij} - n_{ij})^2$$

$N_{ij}$ being defined by the expression $$N_{ij} = \frac{N_o z_o}{[(x_i - x_o)^2 + (y_j - y_o)^2 + z_o^2]^{3/2}}$$

in which:

$x_o$, $y_o$ are the coordinates of the point source in the plane of the detector, $z_o$ is the distance from the point source to the plane of the detector, $N_o$ is the signal at the pixel having coordinates $x_o$, $y_o$, multiplying the number $n_{ij}$ of each pixel by a coefficient proportional to:

$$C_{ij} = \frac{N_o z_o^2}{N_{ij}}$$

Application to medical imaging using gamma camera type display devices.

9 Claims, 1 Drawing Sheet

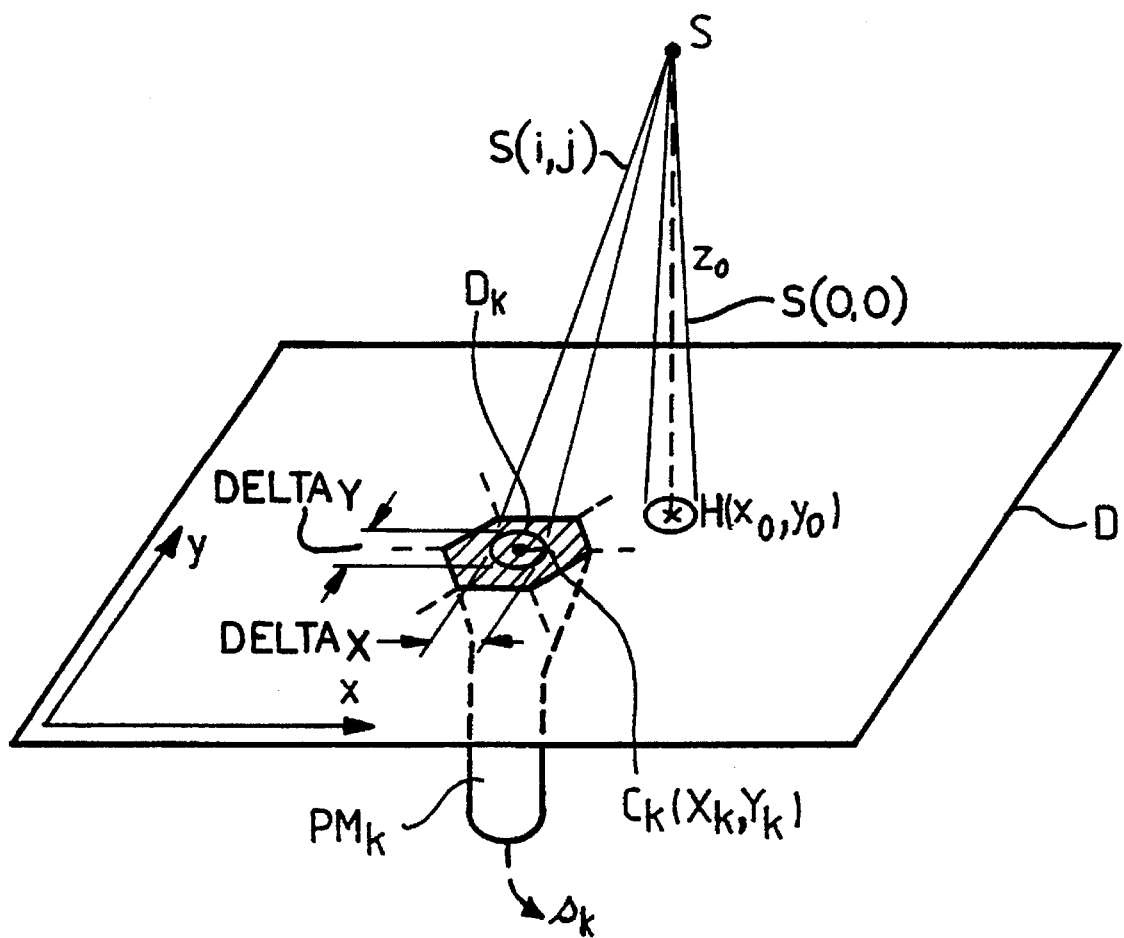
FIG_1

METHOD FOR CORRECTING THE UNIFORMITY OF A GAMMA CAMERA

BACKGROUND OF THE INVENTION

1. Field of the Invention

The present invention relates to a method for the correction of the uniformity of a gamma camera.

The invention can be applied to particular advantage in the field of medical imaging, implementing gamma camera type viewing devices.

A gamma camera generally comprises a detector comprises a plurality of photomultiplier tubes assembled in such a way that their photodiodies constitute a regular plane matrix within which each of these photodiodes, referenced k, is localized by the coordinates $X_k$ and $Y_k$ of its center.

When, under the effect of a gamma radiation pulse emitted by a radio-active isotope injected into a patient's body, a scintillation is produced by an appropriate crystal, for example a thallium-doped sodium iodide crystal, each photomultiplier tube k delivers an analog signal $s_k$ proportional to the light flux received by the corresponding photodiode.

It is then possible to localize the place of emission of this scintillation by computing the barycenter of the light spot formed on the matrix of the detector, the coordinates of the barycenter being given by:

$$X = \left( \sum_k s_k X_k \right) / \sum_k s_k$$

$$Y = \left( \sum_k s_k Y_k \right) / \sum_k s_k$$

The X,Y coordinates of this scintillation are used to compute the address of a memory compartment of the detector in which there is recorded the total number $n_{ij}$ of scintillations detected at the point having the coordinates $x_i$, $y_i$, plus or minus $DELTA_x$ and $DELTA_y$, $DELTA_x$ and $DELTA_y$ representing the sampling intervals selected along the axes x and y, these intervals being typically of the order of some millimeters. In other words, the number of events $n_{ij}$ is increased by 1 if:

$x_i - DELTA_x/2 < X < x_i + DELTA_x/2$ $y_j - DELTA_y/2 < Y < y_j + DELTA_y/2$

The set of numbers $n_{ij}$, after display, constitutes the image sought.

2. Description of the Prior Art

This image obtained by a gamma camera of the above-described type most usually has uniformity defects arising out of the variations in the number of pulses detected per unit of surface area in the field of view of the detector. These uniformity defects may have several causes. These are, firstly, defects due to statistical fluctuations caused by the random character of the emission of the scintillations, hence of the number of pulses detected per unit of surface area. It is possible, however, to minimize the effects of these defects at will by increasing the acquisition time accordingly. Secondly, they are the defects of uniformity of the detector itself. These defects are introduced, for example, by the loss of light between two contiguous photocathodes, the barycenter computation technique which introduces a relative variation in surface area, hence a variation in the number of pulses detected per unit of surface area, the fluctuations in the gain of the photomultiplier tubes which cause corresponding fluctuations in the computation of X and Y and of the energy, as well as variations in the efficiency of the scintillator crystal.

This is why, in order to obtain high quality images, it is necessary, for any gamma camera, to make a correction of uniformity. In its principle, this correction may be made as follows:

the field of view of the camera is illuminated by a uniform radiation flux by using, for example, a point source placed at very great distance from the plane of the detector, then, a computation is made of the defects of uniformity on the image obtained, making it possible then to correct them by any method.

However, it is sometimes difficult or even impossible to place a source at a very great distance. This is either for reasons related to space requirements, for example because the room is too small, or because it would be necessary to handle sources that are excessively active. It then becomes necessary to reduce the source-detector distance. The drawback of this is that it introduces a proximity dome effect that makes the illumination of the detector non-uniform, the pixels closest to the source receiving a greater light flux.

SUMMARY OF THE INVENTION

Hence, the technical problems to be resolved by the object of the present invention is that of proposing a method for the correction of uniformity of a gamma camera comprising a detector giving, for each pixel i,j having coordinates $x_i$, $y_i$, a number $n_{ij}$ representing the number of scintillations recorded in the pixel i,j. The method invented overcomes the effects of the systematic error introduced by the proximity dome effect due to the presence, at a finite distance, of the point source used to assess the uniformity corrections of the detector. This is achieved by multiplying each number nij by a coefficient representing this dome deformation. This coefficient may be computed, pixel by pixel, by having knowledge, through measurement, of the respective positions of the source and of the detector and by carrying out the computation, for each element, of the ratio between the solid angle at which a pixel is seen vertically to the source and the solid angle at which the pixel considered is seen.

In a particular solution to the technical problem raised, according to an improvement to the present invention, this method comprises an initial step consisting in:

placing a point source at a finite distance from the detector;

acquiring the number $n_{ij}$ at each pixel i,j, computing the parameters $x_o$, $y_o$, $z_o$ that minimize the function:

$$F = \sum_{i,j} (N_{ij} - n_{ij})^2$$

$N_{ij}$ being defined by the expression $$N_{ij} = \frac{N_o z_o}{[(x_i - x_o)^2 + (y_j - y_o)^2 + z_o^2]^{3/2}}$$

in which:

$x_o$, $y_o$ are the coordinates of the point source in the plane of the detector, $z_o$ is the distance from the point source to the plane of the detector, $N_o$ is the signal at the pixel having coordinates $x_o$, $y_o$, multiplying the number $n_{ij}$ of each pixel by a coefficient proportional to:

$$C_{ij} = \frac{N_o z_o^2}{N_{ij}}$$

The method according to the invention has several advantages. It makes it possible first of all to place the measurement source relatively close to the detector, and hence to remove the effects of lack of space or of problems of activity of the source. It also removes the need for any special precautions as regards the precise positioning of the source in space. Thus any operator, without any specific tools or training, can perform uniformity correction operations. This is because of the self-adaptive character of the method which is an object of the invention.

BRIEF DESCRIPTION OF THE DRAWING

The following description, made with reference to the appending drawing and given by way of a non-restrictive example, will enable a clear understanding of what the invention consists of and the way in which it can be achieved.

FIG. 1 shows a schematic view in perspective of a detector of a gamma camera.

MORE DETAILED DESCRIPTION

The detector D shown in the drawing of FIG. 1 is constituted by the hexagonal photocathodes $D_k$ of a plurality of photomulitplier tubes $PM_k$ assembled in a plane honeycombed pattern. Each of the photocathodes $D_k$ is referenced in the plane x,y of the detector D by the coordinates $X_k$, $Y_k$ of its center $C_k$.

Generally, under the effect of an incident light flux, each photomultiplier tube $PM_k$ gives an analog electrical signal $s_k$ proportional to the light flux.

Since this is a gamma camera, and as explained further above, the X, Y coordinates of the scintillation that is the source of the emitted light flux are computed as the barycenter of the centers $C_k$ weighted by the signal $s_k$. The assigning of the barycenter X, Y to a pixel having coordinates $x_i$, $y_i$, plus or minus $DELTA_x$, $DELTA_y$, contributes to the increase by one unit, in the corresponding memory compartment, of the number $n_{ij}$ of memory events that have occured in the pixel i,j.

The set of the number $n_{ij}$ collected during a certain acquisition period is used as a basis for the final display of the image sought.

As mentioned earlier, uniformity defects may appear in the images given by a gamma camera, and more particularly uniformity defects related to the detector itself or to the detection method.

To assess the corresponding corrections, the method proposed by the invention comprises an initial step in which a point source S is placed at a finite distance from the detector D, the source being referenced by the coordinates $x_o, y_o$ of its projection H in the plane of the detector and by its distance $z_o$ from the detector D.

The gamma camera is then put into operation so as to give the number $n_{ij}$ which, it may be pointed out, can be substantially rid of the errors due to statistical fluctuations by increasing the acquisition time.

If it is possible to measure $x_o$, $y_o$, $z_o$ (for example with a meter), it is possible to make a correction by applying simple trigonometrical formulae. In principle, the ratio between the solid angles s(o,o) and s(i,j) at which the different pixels are seen by the source s is taken. (As is known, a solid angle is the angle formed at the vertex of a cone.) However, this type of correction may be painstaking or imprecise.

A computation is then made of parameters $x_o$, $y_o$, $z_o$ (which are unknown a priori) which minimize the function F given by:

$$F = \sum_{i,j} (N_{ij} - n_{ij})^2$$

$N_{ij}$ being defined by the expression $$N_{ij} = \frac{N_o z_o}{[(x_i - x_o)^2 + (y_j - y_o)^2 + z_o^2]^{3/2}}$$

in which $N_o$ is the signal at the pixel having the coordinates $x_o$, $y_o$.

F represents the sum of the quadratic deviations between the image $n_{ij}$ and its model $N_{ij}$ in terms of proximity dome.

Since the function $N_{ij}$ is not linear in $x_o$, $y_o$, $z_o$ the analytical resolution of the problem of the search for the minimum of F is not easy. It is advantageously possible to use known algorithms for the optimization of non-linear functions with several variables, of the greatest slope, Booth, Marquardt, Fletcher and Powell, and other types.

The four parameters $x_o$, $y_o$, $z_o$ and $N_o$ being thus determined, it is then possible to correct the numbers $n_{ij}$ of the proximity effect of the source in multiplying them by a coefficient $C_{ij}$ proportional to:

$$C_{ij} = \frac{N_o z_o^2}{N_{ij}}$$

The computation of the uniformity errors is then done in the usual way on the corrected numbers $n_{ij}$, i.e. $C_{ij} \times n_{ij}$ to the nearest value of a constant factor.

It may be noted that the method described has an adaptive aspect since it does not require a priori knowledge of the parameters $x_o$, $y_o$, $z_o$, namely the exact position of the measurement point source.

It must also be stressed that the method according to the invention gives good results despite the use of numbers $n_{ij}$ having errors which, precisely, it is sought to compute, at least when the uniformity defects are relatively small.

What is claimed is:

1. A method for correcting the nonuniformity of a gamma camera, said gamma camera comprising a detector giving, for each pixel i,j having coordinates $x_i$, $y_i$, a number $n_{ij}$ representing the number of scintillations recorded in said pixel, wherein said method comprises the steps of:

placing a point source at a finite distance from said detector;

acquiring the number $n_{ij}$ at a concerned pixel i, j; and multiplying said number $n_{ij}$ at said concerned pixel by the ratio between (1) the solid angle at which a pixel vertical to said point source is seen by said point source and (2) the solid angle at which said concerned pixel is seen by said point source.

2. A method according to claim 1, further comprising the step of minimizing the sum of the quadratic deviations between said number $n_{ij}$ and a model $N_{ij}$ of said number $n_{ij}$.

3. A method according to claim 2, wherein said minimizing step is performed without performing a search by using an algorithm for optimizing non-linear functions, said algorithm being from the group consisting of the Booth Algorithm, the Marquardt algorithm, the Fletcher algorithm, and the Powell algorithm.

4. A method according to claim 2, wherein said model $N_{ij}$ of said number $n_{ij}$ is defined by the expression $$N_{ij} = \frac{N_o z_o}{[(x_i - x_o)^2 + (y_i - y_o)^2 + z_o^2]^{3/2}}$$

wherein:

$x_o$, $y_o$ are the coordinates of said point source in the plane of said detector, $z_o$ is the distance from the point source to the plane of the detector, and $N_o$ is the signal at the pixel having coordinates $x_o$, $y_o$.

5. A method according to claim 4, wherein said multiplying step comprises the step of multiplying said number $n_{ij}$ at said concerned pixel by a coefficient proportional to $$C_{ij} = \frac{N_o / z_o^2}{N_{ij}} \ .$$

6. A method according to claim 1, wherein said finite distance is relatively short such that different pixel receive measurably different amounts of light flux from said point source, said measurably different amounts of light flux being caused by a proximity dome effect.

7. A method for correcting the nonuniformity of a gamma camera, said gamma camera comprising a detector giving, for each pixel i,j having coordinates $x_i$, $y_i$, a number $n_{ij}$ representing the number of scintillations recorded in said pixel, wherein said method comprises the steps of:

placing a point source at a finite distance from said detector;

acquiring the number $n_{ij}$ at a concerned pixel i, j;

computing the parameters $x_o$, $y_o$, $z_o$ that minimize the function:

$$F = \sum_{i,j} (N_{ij} - n_{ij})^2$$

$N_{ij}$ being defined by the expression $$N_{ij} = \frac{N_o z_o}{[(x_i - x_o)^2 + (y_i - y_o)^2 + z_o^2]^{3/2}}$$

in which:

$x_o$, $y_o$ are the coordinates of said point source in the plane of said detector, $z_o$ is the distance from point source to the plane of said detector, $N_o$ is the signal at the pixel having coordinates $x_o$, $y_o$; and multiplying said number $n_{ij}$ at said concerned pixel by a coefficient proportional to $$C_{ij} = \frac{N_o / z_o^2}{N_{ij}} \ .$$

8. A method according to claim 7, wherein said minimizing step is performed without performing a search by using an algorithm for optimizing non-linear functions, said algorithm being from the group consisting of the Booth Algorithm, the Marquardt algorithm, the Fletcher algorithm, and the Powell algorithm.

9. A method according to claim 7, wherein said finite distance is relatively short such that different pixel receive measurably different amounts of light flux from said point source, said measurably different amounts of light flux being caused by a proximity dome effect.

* * * * *